April 3, 1956  W. ALTSTAEDT  2,740,564

APPARATUS FOR THE UNIFORM DISCHARGE OF FINE-GRAINED LOOSE MATERIAL

Filed July 5, 1952

*INVENTOR:*
WERNER ALTSTAEDT
BY Spencer, Johnston,
Cook & Root
ATT'YS

United States Patent Office 2,740,564
Patented Apr. 3, 1956

2,740,564

APPARATUS FOR THE UNIFORM DISCHARGE OF FINE-GRAINED LOOSE MATERIAL

Werner Altstaedt, Ludwigshafen (Rhine), Germany, assignor to Badische Anilin- & Soda-Fabrik Aktiengesellschaft, Ludwigshafen (Rhine), Germany Application July 5, 1952, Serial No. 297,324
Claims priority, application Germany July 27, 1951
4 Claims. (Cl. 222—485)

This invention relates to apparatus for the uniform discharge of fine-grained loose material from containers, as for example for carrying out adsorption or filtration processes continuously in which the adsorbing or filtering mass moves counter to a stream of gas passing upwardly through the mass and is discharged continuously or at certain intervals of time.

According to the present invention apparatus of the said kind is provided, beneath the rigid grate which forms the lower boundary of the chamber for the loose material, with a second grate movable to and fro in the plane thereof which closes the gaps in the rigid grate in such a manner that at one side of each gap there remains an intermediate space through which the loose material leaves the apparatus when the lower grate is moved to and fro. In this apparatus there is available to the gas entering the grate from below a large free cross-section for unhindered entry, and the loose material is discharged without trouble upon movement of the lower grate.

Figure 1:
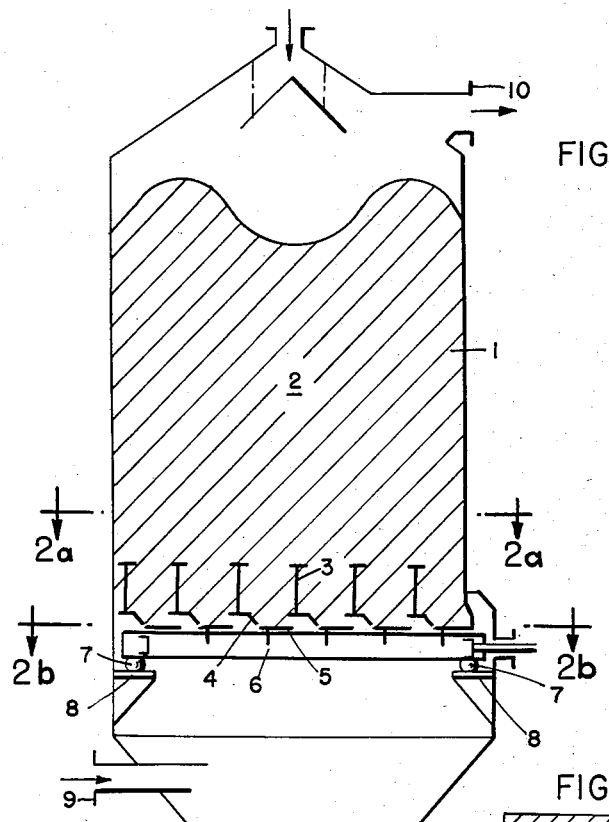
Figure 4:
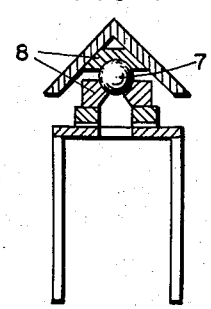
Figures 3A, 3B:
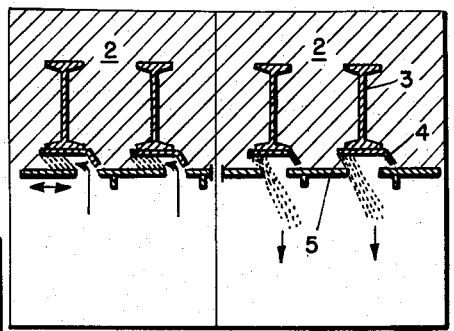
Figure 2:
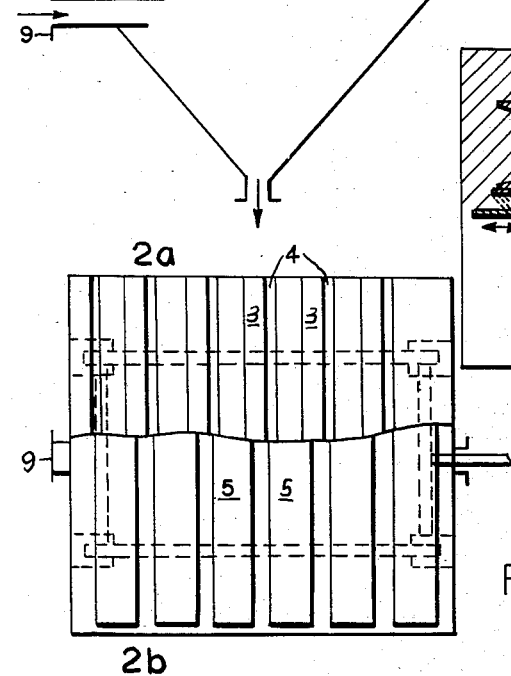

The invention will be further described with reference to the accompanying diagrammatic drawings in which Figure 1 is a sectional elevation of apparatus according to the invention, Figure 2 is a plan, partly on the line 2a—2a and partly on the line 2b—2b of Figure 1, Figures 3a and 3b are enlarged details showing the lower grate in different positions and Figure 4 is an enlarged detail showing the mounting of the lower grate.

Referring to the drawings, a container 1 for fine-grained loose material 2 is bounded at the bottom by a rigidly arranged grate 3 which consists of a plurality of parallel profile supports to one side of each of which is secured a plate 4 which extends obliquely downward almost to a movable grate 5. The grate plate 5 is secured to an arrangement of supports 6 mounted on balls 7. The balls 7 run between two guide tracks 8, the lower of which consists of two rails through which any particles of loose material which penetrate thereinto can fall (Figure 4). The gas enters through a pipe 9, passes through the gaps in the grates and through the loose material and leaves the apparatus through the pipe 10.

After the loose material has become laden with the constituents to be removed from the gas, the movable grate 5 is moved from the position shown in Figure 3a to that shown in Figure 3b for a short time so that part of the loose material lying on the grate plate 5 is pushed off. The lower grate is then returned to its former position whereby fresh loose material is drawn in.

What I claim is:

1. Apparatus for the uniform discharge of fine-grained loose material comprising a stationary grate forming the lower boundary of a container for the loose material, a generally horizontally and reciprocatingly movable grate spaced below said stationary grate, said stationary grate comprising a plurality of substantially parallel spaced profile supports, said movable grate having a plurality of discharge openings therein and imperforate portions thereof being arranged to cover the spaces between said supports and extend under the supports to form generally horizontal chambers therewith along one side of each support in each position of the movable grate, said chambers terminating at said discharge openings being located beneath said supports, and a member positioned between each said support and said movable grate to prevent substantial discharge of material therebetween from the other side of the support in each position of the movable grate.

2. Apparatus for the uniform discharge of fine-grained loose material comprising a stationary grate forming the lower boundary of a container for the loose material, a generally horizontally and reciprocatingly movable grate spaced below said stationary grate, said stationary grate comprising a plurality of substantially parallel spaced profile supports, said movable grate having a plurality of discharge openings therein and imperforate portions thereof being arranged to cover the spaces between said supports and extend under the supports to form generally horizontal chambers therewith along one side of each support in each position of the movable grate, said chambers terminating at said discharge openings being located beneath said supports, and an obliquely downwardly projecting plate secured to each said support and extending almost to said movable grate to prevent substantial discharge of material between the support and the grate from the other side of the support in each position of the movable grate.

3. Apparatus for the uniform discharge of fine-grained loose material comprising a stationary grate forming the lower boundary of a container for the loose material, a generally horizontally and reciprocatingly movable grate spaced below said stationary grate, said movable grate being mounted on balls which run between two guide tracks of which the lower comprises two rails between which may fall any loose particles of material which have penetrated thereinto, said stationary grate comprising a plurality of substantially parallel spaced profile supports, said movable grate having a plurality of discharge openings therein and imperforate portions thereof being arranged to cover the spaces between said supports and extend under the supports to form generally horizontal chambers therewith along one side of each support in each position of the movable grate, said chambers terminating at said discharge openings being located beneath said supports, and a member positioned between each said support and said movable grate to prevent substantial discharge of material therebetween from the other side of the support in each position of the movable grate.

4. Apparatus for the uniform discharge of fine-grained loose material comprising a stationary grate forming the lower boundary of a container for the loose material, a generally horizontally and reciprocatingly movable grate spaced below said stationary grate, said stationary grate comprising a plurality of substantially parallel spaced profile supports, said movable grate comprising a plurality of substantially parallel spaced grate plates arranged to cover the spaces between said supports, one side of each of said grate plate extending under an adjacent said support and forming a generally horizontal chamber therewith in each position of said movable grate, and a downwardly projecting plate secured to each said support and extending almost to an adjacent said grate plate at a side thereof opposed to the said side extending under a support, said downwardly projecting plate and said adjacent grate plate being arranged together to prevent substantial discharge of material therebetween in each position of said movable grate.

References Cited in the file of this patent
UNITED STATES PATENTS

| 60,602 | Wellman | Dec. 18, 1866 |
|---|---|---|
| 2,577,315 | Ellerbeck | Dec. 4, 1951 |